United States Patent
Hans

(10) Patent No.: US 10,387,219 B2
(45) Date of Patent: Aug. 20, 2019

(54) ENABLING MULTIPLE SECURE ELEMENTS IN A CARD COMPUTING DEVICE

(71) Applicant: Oracle International Corporation, Redwood City, CA (US)

(72) Inventor: Sebastian J. Hans, Berlin (DE)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/643,484

(22) Filed: Mar. 10, 2015

(65) Prior Publication Data

US 2016/0266943 A1    Sep. 15, 2016

(51) Int. Cl.
*G06F 3/00* (2006.01)
*G06F 9/54* (2006.01)
*G06F 13/362* (2006.01)

(52) U.S. Cl.
CPC .............. *G06F 9/54* (2013.01); *G06F 13/362* (2013.01)

(58) Field of Classification Search
CPC ........................................ G06F 9/54
USPC ................................. 719/310, 318
See application file for complete search history.

(56) References Cited

U.S. PATENT DOCUMENTS

| | | | |
|---|---|---|---|
| 2003/0021262 A1* | 1/2003 | Ma | G06F 9/544 |
| | | | 370/352 |
| 2007/0005866 A1* | 1/2007 | Pike | G06F 9/4411 |
| | | | 710/306 |
| 2008/0140811 A1* | 6/2008 | Welch | H04L 12/4625 |
| | | | 709/219 |
| 2010/0207742 A1 | 8/2010 | Buhot et al. | |
| 2012/0021683 A1 | 1/2012 | Ma et al. | |
| 2013/0188556 A1* | 7/2013 | Gupta | G06F 9/5055 |
| | | | 370/328 |
| 2014/0098822 A1* | 4/2014 | Galles | H04L 49/208 |
| | | | 370/412 |

(Continued)

FOREIGN PATENT DOCUMENTS

EP    2048594    4/2009

OTHER PUBLICATIONS

Enrique, An Introduction to Java Card Technology—Part 3, The Smart Card Host Application, Sep. 2003.*

(Continued)

*Primary Examiner* — Lechi Truong
(74) *Attorney, Agent, or Firm* — Robert C. Kowert; Meyertons, Hood, Kivlin, Kowert & Goetzel, P.C.

(57) ABSTRACT

Multiple host elements, such as smart cards, embedded secure elements, smart micro SD cards, or other card computing devices, within a mobile computing device (e.g., a mobile phone) may utilize a host API enabling applications to communicate over a network within the computing device. Applications may discover one another, establish themselves as hosts, obtain a host ID, request communication pipes, and utilize a host registry storing information regarding host elements. Additionally, multiple runtime execution environments may co-exist within a single host element of a mobile computing device, communicating and operating as hosts on the computing device even if the host element is associated with a single host ID. Messages from/to the multiple environments may be exchanged with other hosts while the environments share a physical communication link.

20 Claims, 9 Drawing Sheets

(56) References Cited

U.S. PATENT DOCUMENTS

2014/0317686 A1* 10/2014 Vetillard ................ G06F 21/74
726/2
2015/0280961 A1* 10/2015 Akune .................... H04L 61/10
709/223

OTHER PUBLICATIONS

David Fernández, Distributed Virtual Scenarios over Multi-host Linux Environments, (Year: 2011).*
GlobalPlatform, Inc., "GlobalPlatform Device Technology Secure Element Access Control," Version 0.10.0, Public Review, Mar. 2012, Document Reference: GPD_SPE_013, pp. 1-81.
Gerald Madlmayr, "Management of Multiple Secure Elements in NFC-Devices," Sep. 11, 2008, NFC Research Lab, Hagenberg, Cardis 2008, Royal Holloway Univ. of London, www.nfc-research.at, pp. 1-15.

* cited by examiner

US 10,387,219 B2

ENABLING MULTIPLE SECURE ELEMENTS IN A CARD COMPUTING DEVICE

BACKGROUND

The present invention relates generally to software development and more specifically to various aspects of card computing devices.

Card computing devices may provide identification, authentication, data storage and application processing in a variety of systems from mobile phones to automated teller machines and drivers licenses. Various specifications and standards define interfaces and communications protocols for use within and between card computing devices, card readers, hosts and/or terminals. For example, the European Telecommunications Standards Institute (ETSI) has defined a set of protocols and specifications relating to communication for card computing devices.

Java has become a common development platform for creating applications for card computing devices. For instance, Java Card™ is a small Java implementation for embedded devices including card computing devices. Many Java Card™ products also rely on the GlobalPlatform Card Specifications for secure management of applications on a card computing device.

SUMMARY

Described herein are various embodiments of systems and methods for supporting multiple host elements (e.g., secure elements) on a single HCI network within a computing device (e.g., a mobile phone) and for the integration of multiple runtime execution environments (e.g., a RichOS and a TEE platform) on a single host element on the computing device. For instance, one or more objects, interfaces and/or methods of an application programming interface may be utilized to discover and communicate over a network of multiple host elements (e.g., secure elements) within the computing device. In some embodiments, the integration of Java Card based smart cards, embedded secure elements, smart micro SD cards and/or other card computing devices into a network of multiple host elements (e.g., secure elements) may be enabled via a host API provided by a runtime component on the host elements. For example, multiple host elements may discover one another, establish themselves as hosts and obtain a host ID, and request communication gates/pipes with one another, as well as utilize an information registry configured to store and/ manage information regarding host elements, according to some embodiments.

Additionally, two runtime execution environments may co-exist (e.g., both may execute) within a single host element of a computing device. Both runtime execution environments may communicate and be considered separate hosts on the computing device even if the host element is associated with a single host ID. For instance, in one embodiment, a Trusted Execution Environment (TEE) may be integrated, and/or co-exist, with another runtime execution environment, such as a RichOS environment. Both the TEE and the RichOS may communicate over a network (e.g., an HCI network) on a computing device, such as within a mobile phone. In some embodiments, two runtime execution environments (e.g., a Rich OS and a TEE platform) executing on a single Device Host may share a single physical communication link. Additionally, messages from two virtual hosts (e.g., one for each runtime execution environment) may be exchanged between the virtual hosts in the single host element and other host elements (and/or the host controller) in the computing device over the network.

DETAILED DESCRIPTION OF EMBODIMENTS

Described herein are various embodiments of systems and methods for implementing a network of host elements (e.g., secure elements) on a computing device, such as a mobile computing device (e.g., a mobile phone). For instance, a host API may be utilized to discover and communicate within a network of multiple host elements. For example, in some embodiments the integration of a Java Card based smart cards, embedded secure elements, smart micro SD cards and/or other card computing devices into a network of multiple host elements (e.g., secure elements) that communicate via an HCI (or other communication) protocol with a host controller may be enabled via instances of a host API on the host elements. According to some embodiments, a secure element may be considered an element configured to prevent unsecured or unauthorized access to data stored on the secure element. Thus, multiple host elements (e.g., Java Card secure elements) may discover one another, establish themselves as hosts and obtain a host ID, and request communication gates/pipes with one another, as well as utilize a host registry configured to store and/manage information regarding host elements, according to some embodiments.

A host controller interface (HCI) may be considered a protocol for communication between host elements and a host controller computing device (such as a mobile phone). According to some embodiments, an HCI network may be implemented as a star topology with a host controller configured to allocate gates for communication between the host controller and other hosts on the network. Individual host elements may communicate with each other via communication gates/pipes established via the host controller.

Figure 1:
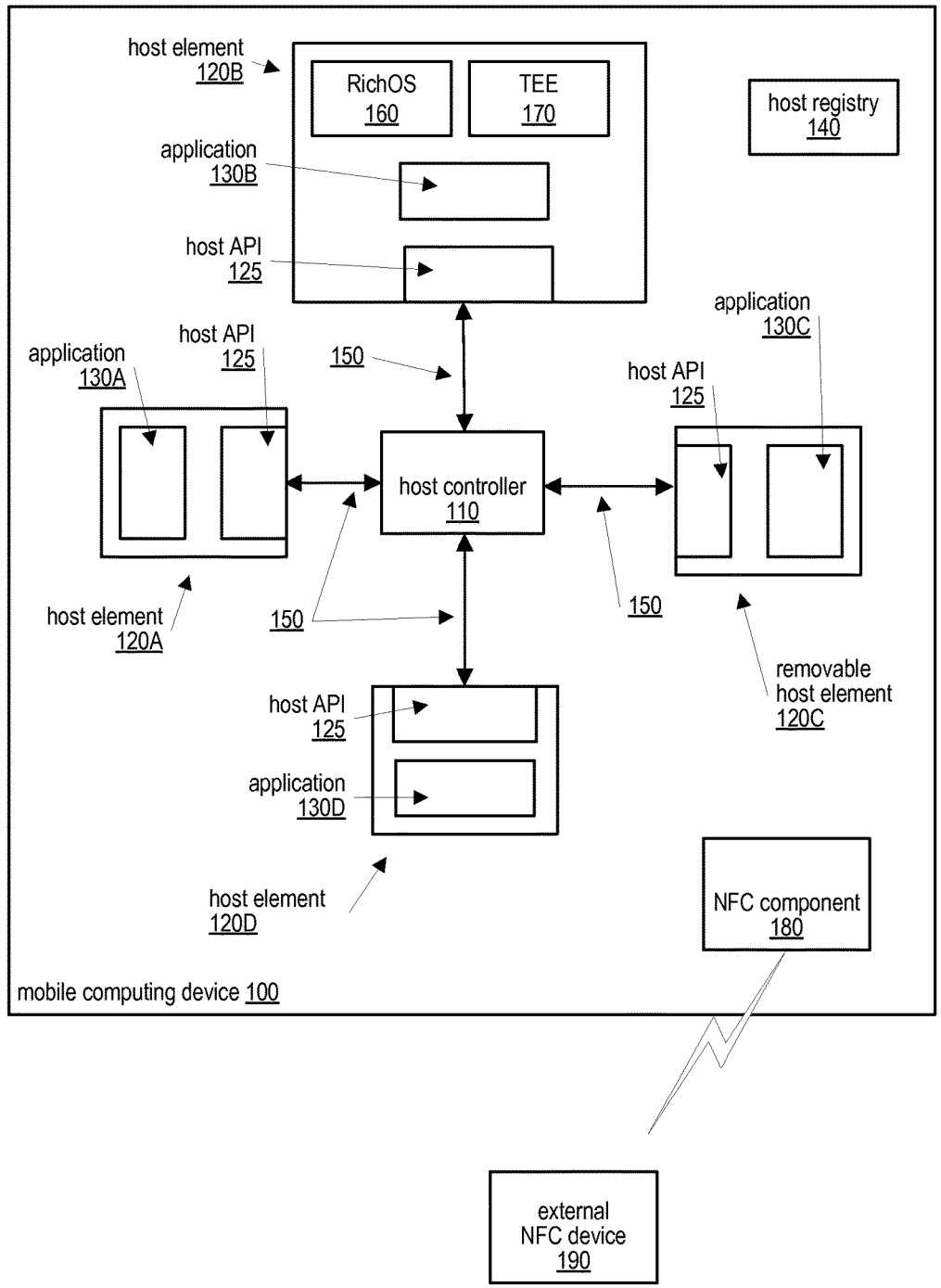
FIG. 1 is a logical block diagram illustrating a mobile computing device including multiple host elements, according to one embodiment.

FIG. 1 is a logical block diagram illustrating a communication network utilizing a host API, according to one embodiment. As shown in FIG. 1, a communication network may be implemented using a host controller 110 communicating across physical data links 150 to multiple host elements, such as host elements 120A, 120B, 120C and 120D. In some embodiments, a communication network may be configured using a star topology, as illustrated in FIG. 1, in which a central hub or host controller, such as host controller 110, manages and routes communication between individual ones of the hosts. As shown in FIG. 1, a host element, such as host element 120B may include two runtime execution environments, RichOS 160 and TEE 170, according to some embodiments. In some embodiments, one or more of the host elements, such as removable host element 120C may be an insertable (and therefore removable) host element (e.g., a SIM card) that may be configured to utilize one or more methods of host API 125 when it is inserted in the device (and boots up).

Mobile computing device 100 may also include a near field communication (NFC) component 180. In some embodiments, a NFC device may be configured to enable wireless near field communication between the mobile computing device and an external NFC device 190. For instance, in some embodiments, an application executing on a host element of mobile computing device 100 may be configured to exchange information with an external device, such as a payment receiving device, via the NFC component 180.

The communication network illustrated in FIG. 1 may represent any of various types of networks, according to different embodiments. For example, in one embodiment, the communication network illustrated in FIG. 1 may represent the integration of various host elements, such as one or more Java Card based smart cards, embedded secure elements, smart micro SD cards, and/or other card computing devices into a network of multiple secure elements (e.g., hosts) configured to communicate via the HCI protocol with a host controller. In some embodiments, the communication network illustrated in FIG. 1 may represent a communication network operating within a single device, such as within a mobile device. A secure element may be considered an element configured to prevent unsecured or unauthorized access to data stored on the secure element, according to some embodiments.

In some embodiments, each host element may be configured to execute one or more applications, such as applications 130A, 130B, 130C and 130D and may also be configured to include, and utilize, host API 125. Host API 125 may represent a programming interface configured to enable the host element to discover, communicate with, and provide information to host controller 110 and/or and other hosts on the communication network.

As noted above, multiple host elements may be used within a computing device. For example, a single mobile phone may include a Subscriber Identification Module (SIM) or Universal Integrated Circuit Card (UICC), an embedded host element, a smart microSD card and a TEE platform, among other examples. However, many systems that interface with computing devices, such as payment or transportation systems may require that the card computing device represent itself as one contactless card (that may include multiple applications). Thus, in some embodiments, a single computing device that includes multiple host elements (some of which may be removable, each possibly executing multiple applications) may represent itself as a single device or a single host element executing multiple applications.

For example, in some embodiments, the devices illustrated in FIG. 1 may present itself to external systems, such as payment systems, as a single host element executing multiple applications. In other words, according to one embodiment, host elements 120A-D and applications 130A-D may be presented to external systems as though there was one device executing applications 130A-D.

In some embodiments, one or more of applications 130A-D may represent contactless applications (e.g., applications configured to utilize and respond to a NFC device) and the multiple host elements (e.g., host elements 120A-D) may each host one or more contactless applications (e.g., applications 130A-D) may be centrally managed to support the existing infrastructure (e.g., existing payment systems, transportation systems, etc.). While described herein in terms of a Java Card based system communicating over an HCI network, the features and functions described herein may also be applied to any of various types of networks, according to different embodiments.

As described herein, a computing device may be configured to enable the use of multiple host elements, each possibly executing multiple applications, within a single HCI network, according to some embodiments. In some embodiments, host elements 120A-D may be implemented using and/or execute a runtime execution environment or platform that includes host API 125 configured to provide various types of functionality enabling the use of multiple host elements (e.g., host elements 120A-D), each possibly executing multiple applications, within a single communication network.

Thus, according to one embodiment, a runtime component executing on a host element of computing device may provide a runtime execution environment for executing one or more applications executing on the host element. For example, in one embodiment, a host element 120 may represent and/or be configured according to the Java Card specification and may provide a Java-based runtime execution environment (e.g., a runtime execution environment based on a Java virtual machine) on which one or more applications, such as application 130 may execute. Additionally, a runtime component on a host element may include, or provide, host API 125 to provide various types of functionality for supporting the use of multiple host elements within an HCI network, according to some embodiments.

For instance, according to one example embodiment, host API 125 may include (and/or expose) an HCIHost class that may provide static interfaces to communicate with HCI resources of the host. The HCIHost may provide methods to retrieve communication gates that are configured for this host and to set and read registry data to a gate registry. Additionally, the HCIHost class may be a permanent entry point object (e.g., a permanent JCRE entry point object), according to some embodiments. Host API 125 may also be configured to implement (and/or expose) an HCIPipe class as a logical communication link between two gates of two different hosts in the network.

In some embodiments, the host API 125 may be utilized to configure communication gates. For example, a host API 125 may be configured to include (and/or expose) one or more interfaces/methods/objects for switching communication gates on or off, as well as for enabling or disabling communication gates. For instance, according to one embodiment, host API 125 may be utilized within an otherwise legacy environment to switch off communication gates assigned to contactless communication protocols that may not be used by applications, such as to prevent a payment terminal from ending up in an endless loop waiting for communication over a gate that is not otherwise being used.

Similarly, in some embodiments, host API 125 may be configured to include (and/or expose) an HCIMessage class that may encapsulate an HCI message to be sent over a pipe (e.g., using a Pipe object) to another host on the network. Host API 125 may also be configured to implement (and/or expose) an HCIReceiver class for handling incoming HCI messages, according to some embodiments.

Additionally, in some embodiments, host API 125 may be configured to include (and/or expose) a HostController class that may represent the host controller in the network. The HostController class may provide a static method usable to discover the HCI network and to provide the basic communication with the host controller (e.g., such as over a permanent administrative pipe).

In some embodiments, the HCIHostController object may be a permanent entry point object (e.g., a permanent JCRE entry point object). In other embodiments, however, the HCIHostController object may be a temporary entry point object (e.g., a temporary JCRE entry point object). For example, as noted above, a host element may be a removable element (e.g., a UICC or SD card) and therefore, between uses of (e.g., calls to) the HCIHostController object the removable host element may have been moved to a different system and the HCIHostController object may be communicating with a different HostController in a different network on the new system. In some embodiments, a reference to a temporary HCIHostController object may not be stored by an application on the host element (e.g., a removable host element), while references to a permanent HCIHostController object may be stored by applications on the respective host element (e.g., a fixed secure element or on the terminal host).

In some embodiments, host API 125 may be configured to provide a mechanism (e.g., via one or more interfaces or methods) for a host element to discover other hosts in the communication network. For instance, a Java Card platform on a host element 120 may include host API 125, which may be configured to provide a mechanism for discovering other host elements (e.g., secure elements) in an HCI network, such as by providing a method configured to communicate with the host controller 110 to obtain information regarding other host elements (e.g., secure elements) in the HCI network. An insertable (and therefore removable) host element (e.g., a SIM card) may be configured to utilize one or more methods of host API 125 to discover other host elements on the HCI network within a mobile device, when it is inserted in the device (and boots up).

Similarly, host API 125 may provide a mechanism to indicate to existing hosts that a new host has been inserted and is now on the communication network, according so some embodiments. For example, when a removable host element (e.g., a SIM card) is inserted into a computing device, the host element, such as host element 120A, may utilize one or more methods of host API 125 to communicate with host controller 110 to announce its presence in the network.

A host element may be able, via the host API 125, to discover other hosts in the network as well as to analyze the identity of other hosts and control communication with them, such as by allowing or rejecting the communication (e.g., for business reasons or security reasons, such as an untrusted host ID), according to some embodiments. The host element may also be able communicate with other hosts using HCI messages and events. For example, host API 125 may be configured enable communication within a network of multiple host elements, such as between the host elements and the host controller within a HCI network.

For instance, host API 125 may be configured to allow a host element (e.g. either removable or not) to allocate (or obtain) a host ID, such as to avoid conflicts with other hosts. According to some embodiments, a host element may request, via one or more methods of host API 125, a host ID from the host controller when the host element becomes part of the HCI network (e.g., upon insertion or device boot up). The host API 125 may also be configured to prevent conflicts regarding host IDS, thus possibly preventing a single host ID from being requested (and assigned) from the host controller multiple times (e.g., by different applications).

Additionally, the host API 125 may provide a mechanism allowing for the exchange of information so that a central registry, such as host registry 140, of hosts and applications may be built and possibly used to configure a host controller or NFC frontend. For example each host element 120A-D may be configured to communicate, via one or more methods of the host API 125, with host controller 110 to provide information usable to generate a host registry 140 of hosts and applications, that may in turn be used to configure the host controller and/or a NFC frontend (e.g., how the NFC presents itself to, and deals with input from, external systems).

Host API 125, as described herein, may also enable the implementation of a downloadable (or updatable) Java Card application (sometimes referred to as a "GlobalPlatform Amendment C" application) that may change or modify one or more contactless parameters for an NFC device or frontend. For example, in some systems utilizing a HCI protocol and network, in some embodiments, application 130A may represent a Java Card applet that is downloaded into host element 120A after the overall computing device (including the other host elements 120 and host controller 110) has been up and running. Thus, after being downloaded, application 130A may need to configure (e.g., publish) one or more contactless parameters to the host controller and/or NFC frontend. Thus, in some embodiments, application 130A may utilize one or more methods of host API 125 to communicate the required contactless parameters to host controller 110 and/or a NFC front end.

Additionally, the host API 125 may also be able to enable the implementation of a central (or super) registry application configured to map information regarding multiple applications executing on multiple host elements within the HCI network. For example, host controller 110 may create and/or utilize an central information registry, such as host registry 140, configured to maintain various types of information regarding one or more host elements 120A-D and/or applications 130A-D. Each host element 120 and/or each application 130 may be configured to communicate with host controller 110 via one or more methods of host API 125 in order to provide information for host registry 140. For example, in one embodiment, host registry 140 may be used to store information regarding a mapping of which applications may be executing on which hosts (e.g., host elements) and may also store information regarding any contactless parameters being used and/or configured by applications on the hosts.

Figure 2:
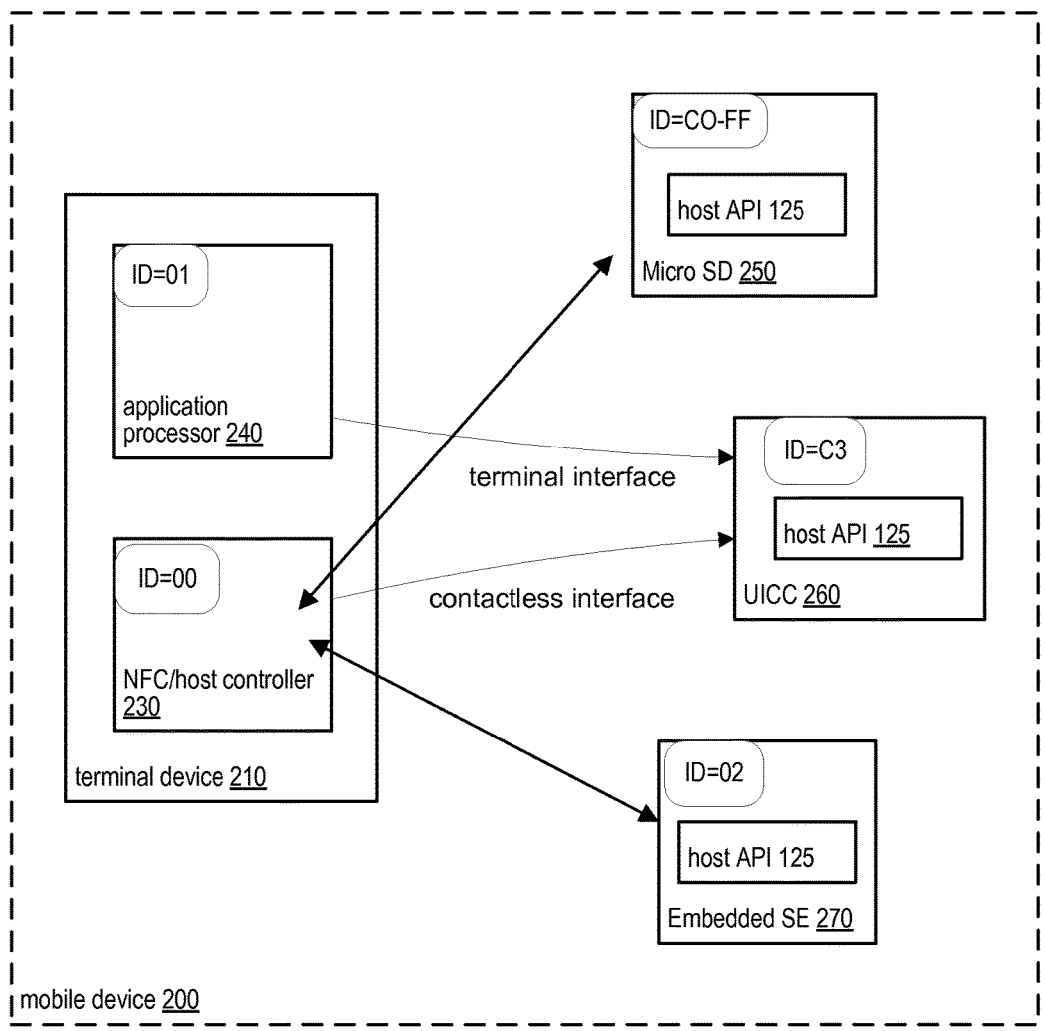
FIG. 2 is a logical block diagram illustrating a mobile device utilizing a host API, according to one embodiment.

By utilizing the functions and or enhancements described herein, multiple host elements may co-exist on a single host element within a mobile computing device. FIG. 2 is a logical diagram of one example mobile device enabling multiple host elements to co-exist, according to one embodiment. As shown in FIG. 2, a mobile device 200 includes a terminal device 210 that in turn may include a host controller, such as NFC/host controller 230, and an application processor 240. Additionally, the mobile device 200 may be configured to include, either permanently or temporarily, any of multiple types of host elements, such as a SIM/UICC card, an embedded secure element, a smart micro SD card, a UICC, other card computing devices, or a secure element featuring a TEE platform, according to some embodiments.

In the example illustrated in FIG. 2, mobile device 200 may be, or may include, any of various computing devices, such as a mobile or cellular phone, handheld computing device, smartphone, smart credit card, ATM card, driver's license, or virtually any other consumer mobile device configured to utilize multiple host elements communicating over an HCI network. Mobile device 200 may include multiple host elements and/or secure elements, such as micro SD 250, UICC 260 and embedded secure element (SE) 270, each of which may include host API 125 configured to enable the multiple host elements to communicate with NFC/host controller 230 without conflict, according to some embodiments. In some embodiments, host API 125 may be implemented according to a Java Card specification, or may otherwise represent an API configured to be execute on (or be usable by applications executing on) a Java Card based host element.

In some embodiments, each of the multiple host elements, such as micro SD 250, UICC 260 and embedded SE 270 may be configured to use the HCI protocol for connecting to the host controller (e.g., NFC/host controller 230). Additionally, in some embodiments, the multiple host elements may all be Java Card based.

Host API 125, as described herein may provide a mechanism on the platform level (e.g., on a Java Card level) to perform various functions and activities related to enabling multiple host elements to exist and communicate over a communication network and to communicate and interoperate with a NFC controller and thus with external services (e.g., payment services). For example, in one embodiment host API 125 may be configured to allow an application executing on a host element to discover additional hosts (e.g., applications and/or host elements) communicating on the HCI network when the host element is inserted (e.g., if the host element is insertable/removable). Additionally, host API 125 may be configured to provide a mechanism for a host element to announce itself on the network (e.g., to indicate to other hosts the host element has been inserted and that a new host in available on the network, according to some embodiments. Host API 125 may also be configured to enable the exchange of data such that a central registry may be created by collecting the necessary data/information for configuring the NFC frontend (or another contactless device). In other words, host API 125 may be considered an API that enables communication within a network of multiple host elements.

Returning now to FIG. 1, after collecting information regarding the host elements and the applications, host controller 110 may be configured to store the information in host registry 140. While mainly described herein as being maintained by host controller 110, in some embodiments, host registry 140 may be maintained by, and/or on, another device, host element or secure element. In some embodiments, a particular application may be configured to create, maintain and/or otherwise provide access to host registry 140. Additionally, in some embodiments, host registry 140 may reside on a different device than host controller 110. 1

As noted above, the host API 125 may enable the development of contactless applications that can provide their contactless parameters directly to the NFC chip or to the central registry on a chip that does not support updateable contactless applications to save memory space on that host element. For instance, a host element (e.g., host) may call one or more methods of host API 125 in order to provide contactless parameters for one or more applications deployed on that host element to a NFC front end or may, using the same or different methods of host API 125, provide contactless parameters to registry application 245 for storage in host registry 140.

Thus use of a host API, such as host API 125 described herein, may in some embodiments allow the deployment of existing contactless applications, but may also allow enhanced applets to enable the management of a contactless application in a complex environment. For example, the host API 125 may enable the deployment of contactless services to multiple host elements in a mobile device that is able to integrate seamlessly into the existing contactless infrastructure (e.g., integrate within a system that does not expect multiple host elements and multiple contactless services).

Furthermore, the host API 125 may provide more flexibility for the implementation of contactless applications (and/or applets) that are deployed on embedded host elements and that may need to be updated during the lifetime of the chip, such as by allowing discovery and updating of information regarding the host element on which the application and/or applet is deployed.

In some embodiments, the host API 125 may provide a single entry point for the runtime execution environment (e.g., a Java Card Runtime Environment) on a host element. The singly entry point may, according to one embodiment, be a programming object (e.g., retrieved via a static method of a factory class) that may implement an interface for interacting with a communication protocol stack, such as the HCI protocol stack. Thus, in some embodiments, host API 125 may provide an easy way to control access to the entry point object. For example, access to the object may be granted based on installation parameters for a particular application (or applet) instance. The entry point object may, in some embodiments, be implemented as a singleton class, such as to avoid concurrent access to the protocol interface by multiple applets.

Figure 3:
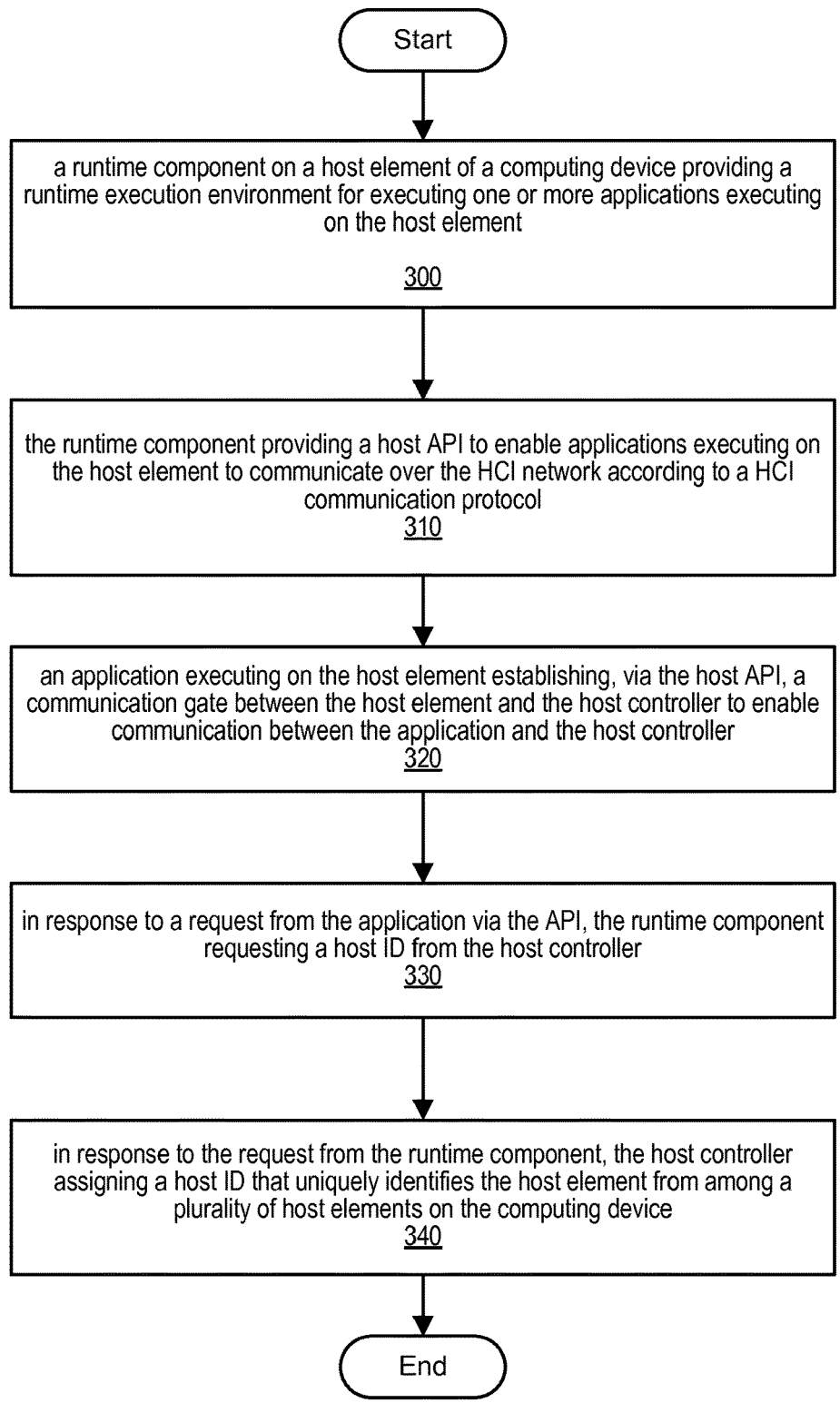
FIG. 3 is a flowchart illustrating one embodiment of a method for implementing a communication network including multiple host elements, as described herein.

FIG. 3 is a flowchart illustrating one embodiment of a method for implementing a communication network including multiple host elements, as described herein. As illustrated in block 300, according to one embodiment, a runtime component executing on a host element of computing device may provide a runtime execution environment for executing one or more applications executing on the host element. For example, in one embodiment, a host element 120 may represent and/or be configured according to the Java Card specification and may provide a Java-based runtime execution environment (e.g., a runtime execution environment based on a Java virtual machine) on which one or more applications, such as application 130 may execute.

As shown in block 310, the runtime component may provide a host API to enable applications executing on the host element to communicate over the HCI network according to the HCI communication protocol, in one embodiment. For example, as discussed above, a host element 120 may provide host API 125 which applications, such as application 130 may use in order to perform any of various tasks, such as open communicate gates, discover and communicate with other host elements (and/or applications executing on host elements), and read/store information to an information registry, such as host registry 140, among other examples. While described herein mainly in terms of providing communication over a HCI network according to a HCI communication protocol, a host API, as described herein, may enable communication over any of various types of network and according to any of various types of communication protocols.

As shown in block 320, an application executing on the host element may establish, via the host API, a communication gate between the host element and the host controller to enable communication between the application and the host controller, according to one embodiment. For example, the host API 125 may include (or expose) one or more objects, interfaces and/or methods usable by an application to establish a communicate gate over the HCI network with a host controller 110. The host controller and the application may then be able to communicate over the HCI network, according to the HCI communication protocol. The application may communicate with the host controller for any of various reasons and/or to perform any of various functions, such as to request a host ID, discover other host elements, determine information regarding other applications and/or host elements from a host registry, etc.

In some embodiments, a communication gate may be used only for a particular function/activity, while in other embodiments a single communication gate may be used for communication over a more extended period and for more than one function or activity.

As shown in block 330, the runtime component may request, in response to a request from an application via the host API, a host ID from the host controller. For example, an application 130 executing on a host element 120 may access one or more objects, interfaces and/or method exposed by host API 125 (e.g., provided by the runtime component) to request a host ID from the host controller, according to one embodiments. Within a computing device, such as mobile computing device 100, an application and/or host element may need to have a host ID to function as a communication endpoint (and/or as a host element) within the communication network (e.g., the HCI network). Thus, in some embodiments, an application 130 on a host element 120 may access one or more objects, interfaces and/or methods of host API 125 in order to request a host ID from host controller 110.

As shown in block 340, in response to the request from the runtime component, the host controller may assign a host ID, according to some embodiments. In some embodiments, the host ID may identify the host element as a host on the mobile computing device (e.g., on the HCI network) and may also be unique among host IDs for all hosts elements on the mobile computing device (e.g., on the HCI network).

A host controller may receive requests for host IDs from multiple host elements and may assign a respective, unique, host ID to each respective host element, according to some embodiments. For instance, according to some embodiments, host controller 110 may receive, from individual ones of a plurality of host elements (e.g., micro SD 250, UICC 260, embedded SE 270 and/or host elements 120A-D) connected via a physical data link 150, respective requests for a host ID, wherein a host ID may uniquely identify the respective host element form among the plurality of host elements.

Additionally, a host controller may assign a respective host ID to each requesting host element so that no two host elements receive the same host ID, as shown in block 310, according to some embodiments. For example, in response to receiving a request for a host ID from a respective one of the host elements (e.g., micro SD 250, UICC 260, embedded SE 270 or one of host elements 120A-D), a host controller 110 may assign a host ID to the requesting host element. The host controller 110 may also resolve conflicts between host elements to ensure that no two of the plurality of host elements receives the same host ID, according to one embodiment.

In some embodiments, an application executing on a host element may initially request a host ID (e.g., via host API 125), but the host ID may be assigned to the runtime component and/or the host element, rather than to the application itself. Thus, in some embodiments, a host element may only be assigned one host ID even if more than one application may be executing on that particular host element.

Figure 4:
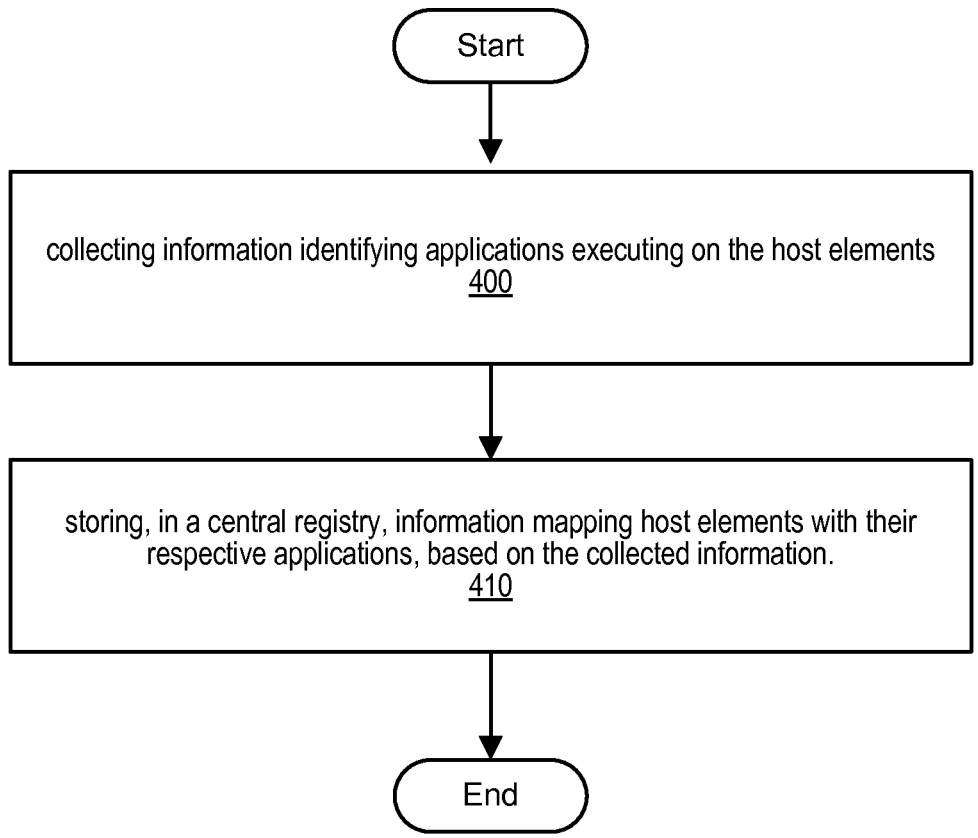
FIG. 4 is a flowchart illustrating one embodiment of a method for using a host registry, as described herein.

FIG. 4 is a flowchart illustrating one embodiment of a method for using a host registry, as described herein. As illustrated in block 400, information may be collected identifying applications executing on the host elements. Additionally, in some embodiments, additional information regarding the applications may also be collected. For example, information regarding any contactless parameters for the applications may be collected in some embodiments. For example, in one embodiment, a host controller 110 may collect information from respective ones of the plurality of host elements (e.g., micro SD 250, UICC 260, embedded SE 270 or one of host elements 120A-D) regarding applications (e.g., applications 130A-d) executing (e.g., deployed) on the host elements. The collected information may identify applications executing on a respective host element, such as by application ID, and in some embodiments may include information regarding one or more contactless parameters for at least one application, according to some embodiments. In some embodiments, an application executing on a host element may access one or more objects, interfaces and/or methods of host API 125 to provide the information to be collected. The information may be provided to the host controller, or to another host element, configured to manage the host registry 140, according to various embodiments.

In other embodiments, a host element may be configured to store the information directly into host registry 140. For example, in one embodiment, the particular host element may be configured to manage the host registry and therefore may directly store information into the host registry. In another embodiments, the host registry 140 may be accessible within the computing device may host elements without the need for the host controller (or another host element) to manage the storing and reading of information from the host registry.

Information mapping host elements with their respective applications may be stored in a central registry based on the collected information, as shown in block 410. For instance, in one embodiment, the host controller 110 may store, in a central registry, such as host registry 140, information mapping host elements with respective applications executing on a respective host element. In some embodiments, one or more contactless parameters for an application may also be saved in the host registry, such as for use with configuring the NFC component 180. For example as described above, host controller 110 may be configured to associate hosts with applications using host IDs and application IDs in host registry 140. In some embodiments, hosts and/or applications may also be associated with their respective contactless parameters via information stored in host registry 140.

Figure 5:
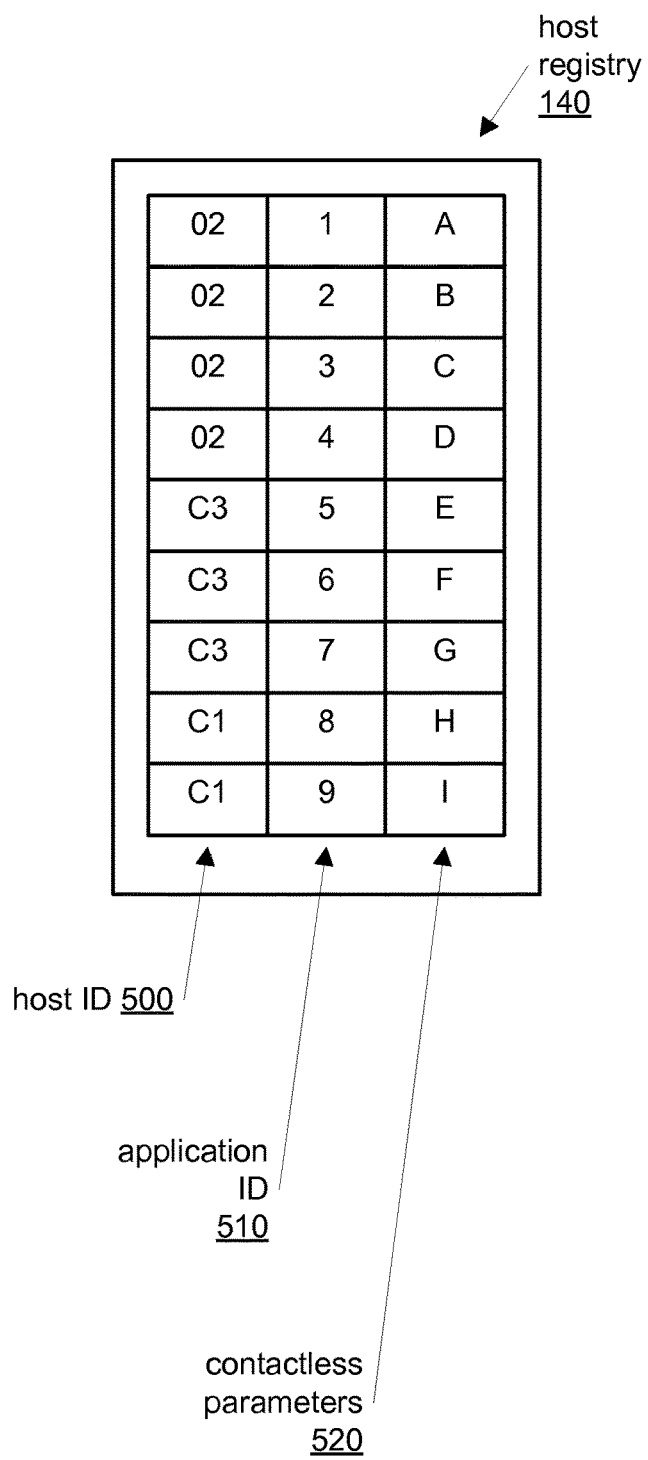
FIG. 5 is a logical block diagram illustrating a host registry, according to one embodiment.

FIG. 5 is a logical block diagram illustrating a central registry, according to one embodiment. As illustrated in FIG. 5, a central registry, such as host registry 140 may be configured hold (e.g., store or maintain) and make available, information regarding multiple applications executing on multiple host elements. For instance, host registry 140 may be configured to hold information mapping individual applications to the host elements (e.g., secure elements) on which they are deployed. Host registry 140 may map applications to hosts based on associating an application ID 510 to a host ID 500 and may also be used to store a set of one or more contactless parameters 520 for each application, according to some embodiments. Thus, in one example embodiment illustrated in FIG. 5, host registry 140 may be include information indicating that four applications with application IDs "1", "2", "3" and "4" are deployed on a host element with host ID "02" and that the four applications have four different, respective, sets of contactless parameters, "A", "B", "C", and "D". Similarly, host "C3 may have applications "5", "6" and "7" deployed which have contactless parameters "E", "F" and "G" respectively, according to the example embodiment illustrated in FIG. 5. Continuing with the example of FIG. 5, host "C1" may have applications "8" and "9" deployed which have contactless parameters "H" and "I" respectively.

While the example embodiment illustrated in FIG. 5 uses simply alpha numeric identifiers for host ID 500, application ID 510 and contactless parameters 520 for ease of illustration, in other embodiments, different (and more complex) forms of data and/or information may be used in, and/or in conjunction with, host registry 140. For example, host IDs, application IDs and/or contactless parameters may be identified in any of various manners and not simply using the alpha numeric samples illustrated in FIG. 5.

Figure 6:
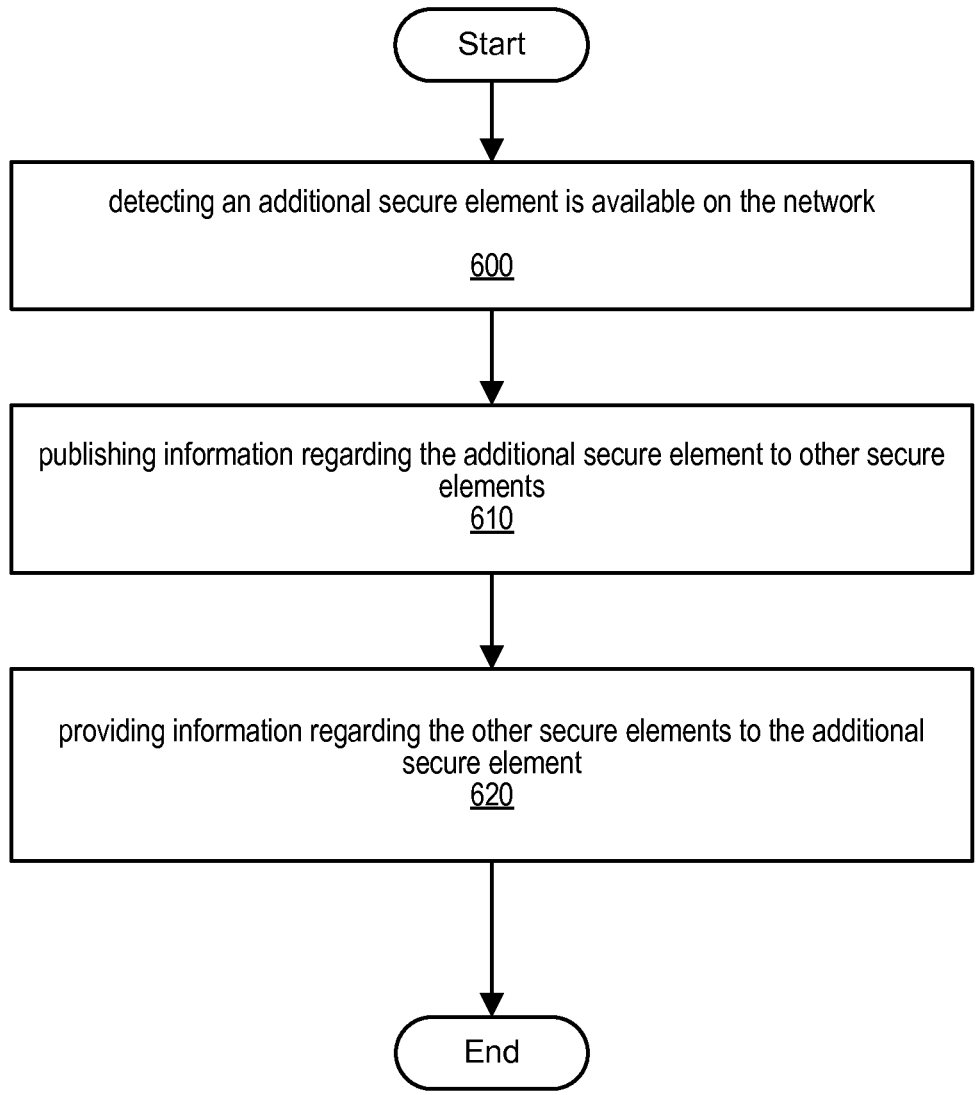
FIG. 6 is a flowchart illustrating one embodiment of a method for a new host element to discover other hosts on the network.

FIG. 6 is a flowchart illustrating one embodiment of a method for a host element to discover other hosts on the network. As shown in block 600, an additional host element may be detected as available on the network. For example, host controller 110 may detect that an additional host element (e.g., micro SD 250, UICC 260, embedded SE 270 or one of host elements 120A-D) is communicating over the HCI network. For instance, a new SIM card (or other insertable host element) may have been inserted in to a mobile device, according to one example embodiment. When inserted, a host element may be configured to utilize host API 125 to discover information regarding the HCI network and begin communicating over the network, such as establish a communication gate with the host controller to request a host ID, according to some embodiments. As described above, a host element may call one or more methods (or access other programmatic interfaces) of host API 125 in order to begin communicating over the network.

In response to detecting the new host element, host controller 110 may publish information about the additional host element to others of the plurality of host elements, as shown in block 610, such as by storing the information in the host registry 140 or by sending the information to the other host elements over the HCI network, according to some embodiments. In other embodiments, however, individual host elements may store information directly to the host registry 140, such as by using one or more interfaces (or methods) of host API 125, thereby publishing information to other host elements on the HCI network.

Additionally, the host controller may provide information regarding the other host elements on the network to the new host element, as illustrated in block 620. For example, the new host element may call one or more methods of host API 125 to request information regarding other host elements on the network and in response, host controller 110 may provide the requested information, such as by retrieving it from host registry 140 and sending it using one or more HCI messages. Alternatively, the new host element may be configured to obtain information regarding other host elements directly from the host registry, such as via one or more interfaces (methods) of host API 125, according to some embodiments.

According to some embodiments, a Trusted Execution Environment (TEE) may be integrated with an HCI (or other communication) network on a computing device. The TEE may be configured to host contactless services in card emulation mode or in reader mode, host a central registry for all the contactless services in the HCI network, manage and resolve conflicts between contactless parameters, build a routing table supporting application selection and send it to the host controller (e.g., on the NFC chip), host the PPSE application for contactless EMV payment apps, and offer a UI based on the trusted UI of the TEE platform, among other functions. Thus many of the features described above as being performed by host controller 110 may, in some embodiments, be performed by a TEE.

Typically, a host in a HCI network may be connected via a dedicated physical link with the host controller and HCI messages are exchanged over this link. For example, a UICC or smart micro SD card may use a Single Wire protocol. A Device Host may be connected via a single physical link to a host controller. However, in some embodiments, two runtime execution environments (e.g., a Rich OS and a TEE platform) executing on a single Device Host may share a single physical link and HCI messages from two virtual hosts (e.g., one for the RichOS and another for the TEE platform) may be exchanged between the virtual hosts in the single device and the host controller in the HCI network.

Figure 7:
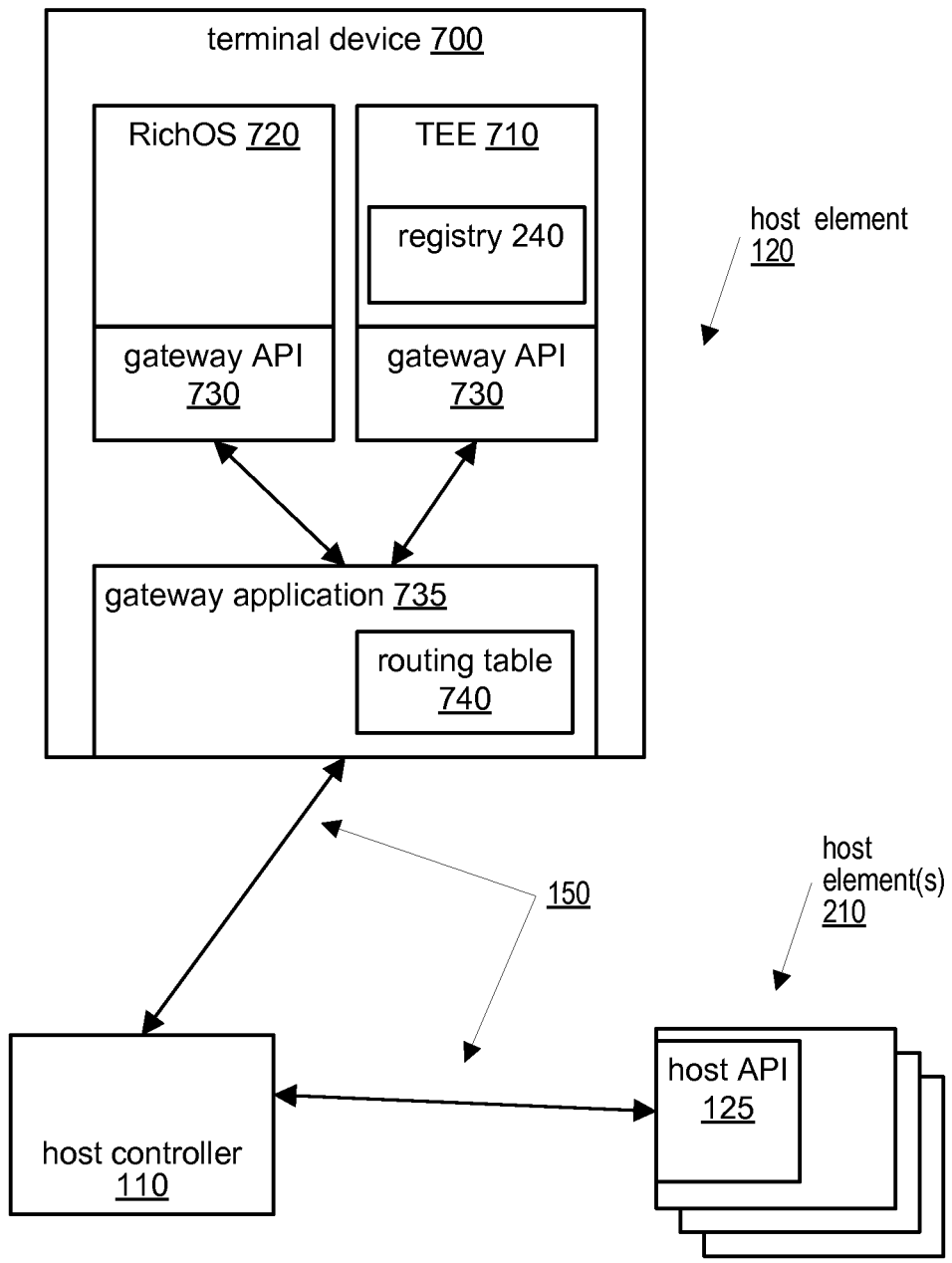
FIG. 7 is a logical diagram illustrating a terminal device including two runtime execution environments, according to one embodiment.

FIG. 7 is a logical diagram illustrating a terminal device including two runtime execution environments, according to one embodiment. As shown in FIG. 7, terminal device 700 may include two runtime execution environments, TEE 710 and RichOS 720, according to some embodiments. In some embodiments, TEE 710 and RichOS 720 may be the same as, or may represent, TEE 170 and RichOS 160, described above. Each of the runtime execution environments may be configured to, or desire to, communicate on the network as a host, however, the host controller and/or the communication protocol (e.g., HCI protocol) may be limited to only having a single host per device. Thus, according to some embodiments, a device executing two runtime execution environments (e.g., terminal device 700), each configured to be a HCI host, may utilize a routing gateway to control the flow of commands over the single physical link to the host controller. The routing gateway may be implemented via a gateway API 730 and may be configured to perform various functions related to enabling two hosts to communicate from a single device, according to various embodiments. In some embodiments, gateway API 730 may be the same as, or may represent, host API 125.

For instance, in some embodiment gateway API 730 may be configured to implement a set of classes/object similar to those described above regarding host API 125. Thus, according to one example embodiment, gateway API 730 may include (and/or expose) an HCIHost class that may provide static interfaces to communicate with HCI resources of the host. The HCIHost may provide methods to retrieve communication gates that are configured for this host and to set and read registry data to a gate registry. Additionally, the HCIHost class may be a permanent entry point object (e.g., a permanent JCRE entry point object), according to some embodiments. Gateway API 730 may also be configured to implement (and/or expose) an HCIPipe class as a logical communication link between two gates of two different hosts in the network.

Similarly, in some embodiments, gateway API 730 may be configured to include (and/or expose) an HCIMessage class that may encapsulate an HCI message to be sent over a pipe (e.g., using a Pipe object) to another host on the network. Gateway API 730 may also be configured to implement (and/or expose) an HCIReceiver class for handling incoming HCI messages, according to some embodiments.

Additionally, in some embodiments, gateway API 730 may be configured to include (and/or expose) a HostController class that may represent the host controller in the network. The HostController class may provide a static method usable to discover the HCI network and to provide the basic communication with the host controller (e.g., such as over a permanent administrative pipe). In some embodiments, the HCIHostController object may be a permanent entry point object (e.g., a permanent JCRE entry point object).

In other embodiments, however, gateway API 730 may be configured to utilize an instance of host API 125 rather than providing its own mechanisms for communicating over a HCI network.

In one embodiment, a gateway application 735 may be configured to implement a routing gateway, as described herein. For example, in one embodiment, gateway application 735 may be configured to treat each runtime execution environment (e.g., RichOS 720 and TEE 710) as a virtual host on the network and to manage and route communications to and from each virtual host. The routing gateway (e.g., gateway application 735) may be configured to control the allocation of pipes used by the two virtual hosts (e.g., when the device boots up). Additionally, the routing gateway may track the relationship between a virtual host and one or more gates and pipes that they virtual host uses.

Similarly, the routing gateway may be configured to control the actual routing of messages and events from and to the virtual hosts. For example, in one embodiment, the routing gateway may be configured to using various identifiers, such as a pipe ID to map messages (and/or events) and a particular virtual host on the device. For example, in one embodiment, the routing gateway may be configured to route messages based on the ID of the pipe over which the messages are communicated.

In some embodiments, an API, such as gateway API 730, may be utilized to provide access by TEE 710 (e.g., and/or by RichOS 720) to various HCI network features, such as being able to discover which HCI hosts are available, establish communication channels over HCI to other hosts, retrieve information from other hosts (e.g., such as to build a central registry of applications) via APDUs and/or low level HCI commands. For example, gateway API 730 may provide one or more methods or objects accessible by TEE 710 to access and/or perform various functions/activities on the communications network.

Additionally, TEE 710 may be able to invoke a trusted application via HCI, such as to present the user with a trusted user interface on a mobile device. Furthermore, the gateway API 730 and other runtime enhancements described herein may allow a trusted application to execute in card emulation mode and register itself with a central registry, such as host registry 140 and to enable a trusted application to function as a contactless reader mode application. In some embodiments, TEE 710 may be configured to store host registry 140, while in other embodiments host registry 140 may be hosted on another host element.

In some embodiments, the TEE 710 may be integrated with an NFC frontend, such as NFC controller 230, via the HCI protocol and may perform a role in the realization of NFC services, thereby possibly avoiding problems that might otherwise occur with deployment of these services, according to some embodiments. For instance, integrating the TEE into the network, as described herein, may solve an issue with managing the service in an efficient manner. In some embodiments, the resources (e.g., memory, computing power and user interface) available via TEE 710 may help resolve issues and help build an efficient management application for the HCI network.

As described herein, gateway application 735 may seamlessly integrate the TEE 710 platform with the HCI network without any changes to existing HCI implementations in other host elements, NFC chips and other devices, according to some embodiments.

In some embodiments, gateway application 735 may be configured to handle the HCI messages sent and received over a data link layer between one device, such as terminal device 700, and the host controller 110. For example, a terminal device 700 may include a routing gateway (e.g., gateway application 735) configured to manage messages communicated over a data link between the terminal device and a NFC frontend, such as NFC/host controller 230, that may be functioning as a host controller. In some embodiments, HCI messages may be encapsulated in an object exposed by gateway API 730 that provides the necessary methods to "set" and "get" the data of the HCI message. Additionally, an HCI message object may be configured to handle fragmented HCI messages (e.g., by fragmenting and unfragmenting them transparently to TEE 710).

In order to route messages two virtual hosts (e.g., runtime execution environments) executing on the same device, a routing gateway may be configured to map the pipe ID of every pipe created by (or to) each virtual host and then route messages received over a particular pipe to the virtual host associated with that pipe.

For example, whenever a virtual host on the device requests that a pipe be opened, the routing gateway may associate the ID of the pipe with the virtual host requesting the pipe. Subsequently, whenever a message is received over that pipe, the routing gateway may route the message to the virtual host associated with the ID of that pipe. The routing gateway may record information associating pipes and virtual hosts in a routing table (or other structure) and may update that information whenever a pipe is opened or closed.

In some embodiments, the routing gateway may be connected to the virtual hosts via a gateway API 730 used by the virtual hosts when performing communication related tasks. For example, TEE 710 may be configured to call one or more methods of the gateway API 730 to registry itself with the gateway application 735 (and therefore possibly with a host controller or other devices). Gateway API 730 may be used by a TEE 710 that is executing on the same device as another host, such as on terminal device 700 that is also executing RichOS 720.

A gateway API 730, as described herein, may include methods (and/or objects) providing various types of functionality, according to different embodiments. For example, a gateway API 730 may be configured to provide methods for defining HCI gates that are used as endpoints for communication pipes. According to some embodiments, pipes may be considered allocated logical communication channels between two hosts have unique pipe IDs assigned by the host controller and used for specific communication purposes. Additionally, in some embodiments routing of messages within the network may be performed based on pipe IDs. In some embodiments, certain standardized pipe IDs may be used to open particular pipes to particular gates and the gateway API may also provide a mechanism (e.g., one or more methods and/or objects) accessible within the runtime execution environment (e.g., by TEE 710) for opening standardized pipes.

The gateway API 730 may also provide methods (or objects) for sending HCI commands and receiving responses and/or events over an existing communication pipe. Methods and/or objects of gateway API 730 may also provide a mechanism for reading and writing data to a registry of gates for a specific (other) host on the network, according to some embodiments. The gateway API may also provide methods for opening pipes to a specific gate on a specific host and for closing an open pipe. In order to provide the ability to open gates and pipes, the gateway API may also provide methods (and/or objects) for retrieving the host topology of the current HCI network and the gateway API may also be configured to handle the fragmentation of HCI messages at the runtime level, thereby possibly making such fragmentation transparent to a trusted application (or any application at the runtime level).

Gateway application 735 (e.g., via gateway API 730) may be implemented using a platform independent object oriented language, such as Java, and may be implemented as part of a Java Card platform on which TEE 710 may be executing, according to some embodiments. While described herein mainly in terms of Java and JavaCard-based devices, the features and techniques described herein may be applied to other platforms based on other programming languages, according to various embodiments.

Figure 8:
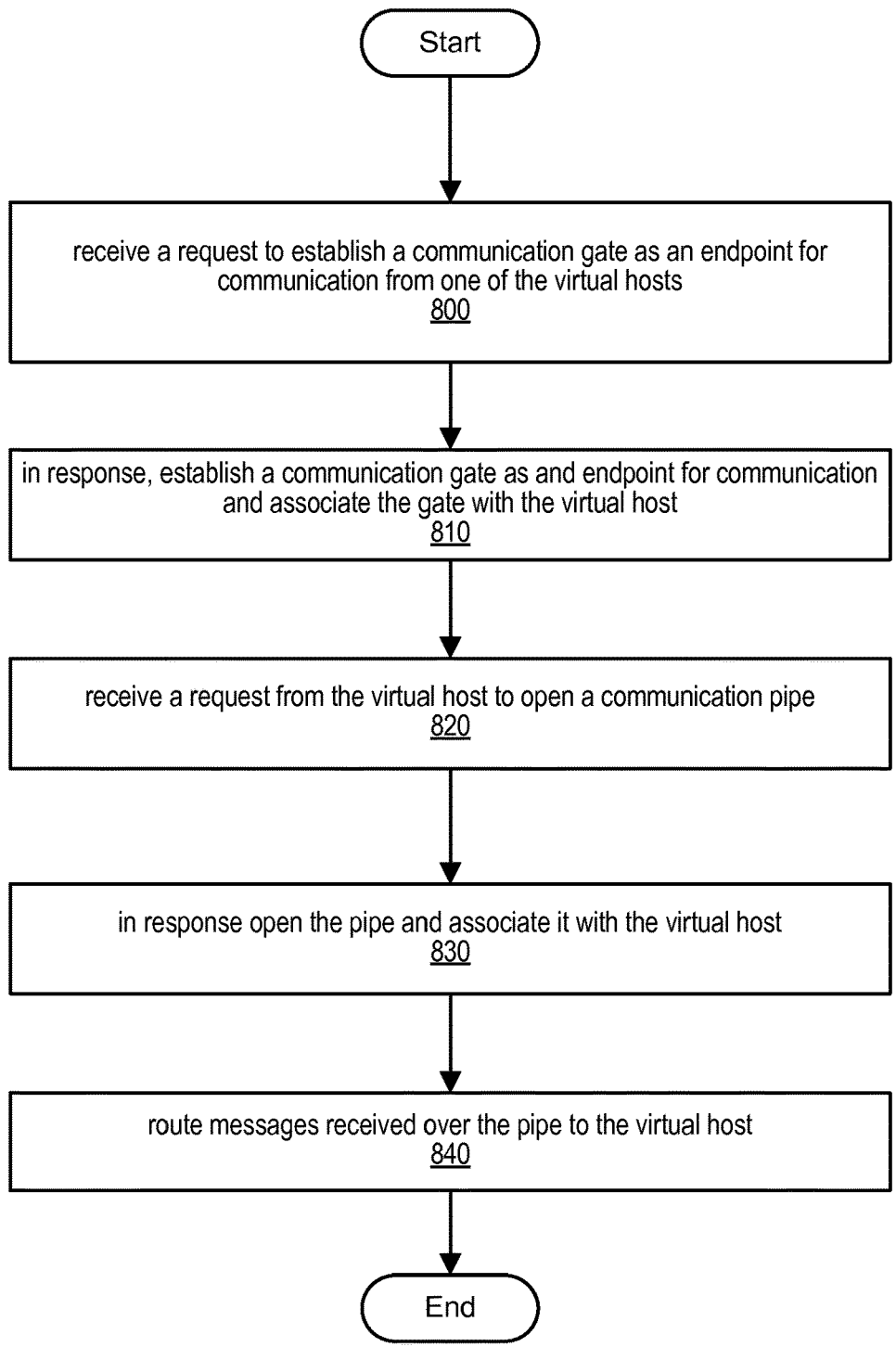
FIG. 8 is a flowchart illustrating one embodiment of a method for implementing multiple virtual hosts on a single device, as described herein.

FIG. 8 is a flowchart illustrating one embodiment of a method for implementing multiple virtual hosts on a single device, as described herein. As shown in block 800, a request to establish a communication gate as an endpoint for communicating on the network may be received by one of multiple virtual hosts, according to one embodiment. For example TEE 710 may access one or more methods and/or objects exposed by gateway API 730 to request that a gate be established as an communication endpoint on the HCI network (e.g., for communication over HCI communication data link 150) and in response gateway application 735 may open the requested gate and may associate the established gate with the requesting virtual host, as shown in block 810. For instance, gateway application 735 may associate the establish gate with TEE 710 by storing appropriate information in routing table 740 (or using some other suitable method).

Additionally, gateway application 735 may receive a request from the virtual host to open a communication pipe for communicating over the HCI network, as shown in block 820. For instance, TEE 710 may call or access one or more methods and/or objects exposed by gateway API 730 to request that a communication pipe be opened to a particular gate on a particular host (e.g., another host on the network). In response, gateway application 735 may open the requested pipe and associate the open pipe with the requesting virtual host, as shown in block 830. For instance, gateway application 735 may be configured to store information associating the open pipe (e.g., the pipe ID) with TEE 710 in routing table 740, according to some embodiments.

Subsequently, gateway application 735 may receive one or more messages over the open pipe from another host on the network and may route the received messages to the virtual host, as shown in block 840. For instance, according to some embodiments, gateway application 735 may be configured to use the pipe ID of an open pipe to determine which virtual host should receive the received message. For example, gateway application 735 may utilize information stored in routing table 740 to determine that a particular pipe is associated with a particular virtual host and may then route messages received over that particular pipe to that particular virtual host.

Figure 9:
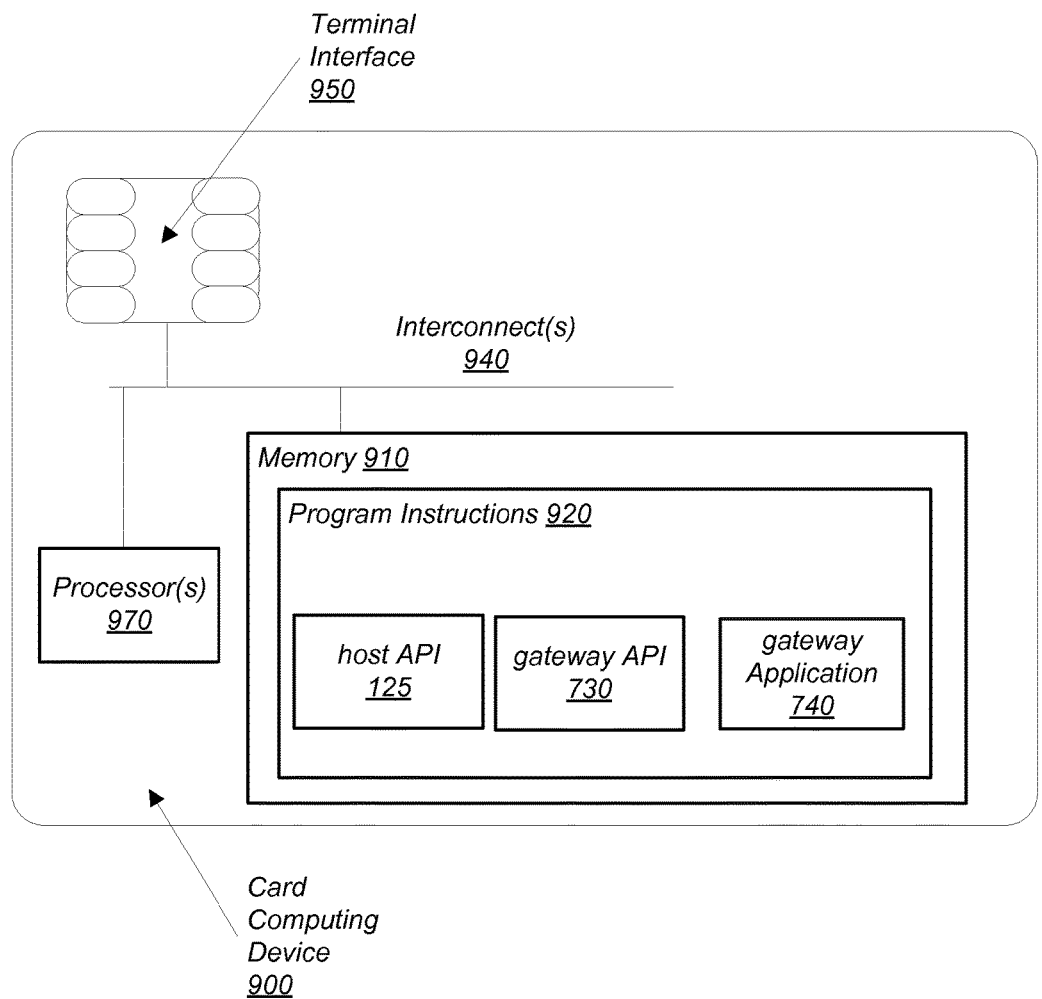
FIG. 9 is a logical diagram illustrating one example embodiment of a card computing device configured to implement the features and techniques described herein.

The techniques described herein may be implemented in any of a wide variety of computing systems. FIG. 9 illustrates a card computing device configured to function and operate as a host element (or host controller) within a mobile computing device configured to support multiple host elements on a single network and multiple runtime execution environments on a single device, as described herein and according to various embodiments.

Card computing device 900 may be any of various types of pocket-sized cards with embedded integrated circuits, including, but not limited to a smart card, a smart microSD card, an embedded host element, an embedded host element featuring a TEE platform, a chip card, an integrated circuit card (ICC), a universal integrated circuit cards (UICC), credit card, automated teller machine (ATM) card, mobile phone subscriber identity module (SIM) card, authorization card for pay television, pre-payment card, high-security identification card, access control card and telephone call payment card. Card computing device 900 may be configured for use in various roles in any of various systems, such as to provide identification, authentication, data storage and/or application processing.

As described herein, card computing device 900 may be configured to communicate with external devices and services via any of various card-reading devices and/or interfaces. For example, in some embodiments, card computing device 900 may include one or more terminal interfaces 950. In some embodiments, terminal interface 950 may be a communications medium between the card computing device and a host or terminal for the card computing device. Terminal interface 950 may be configured to communicate according to any of various protocols, including but not limited to Single Wire Protocol (SWP) and Host Controller Interface (HCI) specifications.

In some embodiments, terminal interface 950 may include a contact area comprising several electrically conductive contact pads which may provide electrical connectivity when inserted into a terminal, host or other card reader. In other embodiments, terminal interface 950 may comprise a contactless communication device configured to communicate with a terminal via radio waves.

While described herein mainly in reference to pocket-sized integrated circuit cards, the methods and techniques described herein may also be performed on other computing devices. Thus, in some embodiments, card computing device 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A card computing device 900 may include a processor unit 970 (possibly including an integrated circuit, a self-programmable one-chip microcomputer (SPOM), multiple processors, a single-threaded processor, a multi-threaded processor, a multi-core processor, etc.) which may be configured to execute one or more components or applications, such as host API 125, gateway API 730 and/or gateway application 735, which may be present within program instructions 920 stored in memory 910.

The card computing device 900 may include one or more system memories 910 (e.g., one or more of cache, SRAM DRAM, RDRAM, EDO RAM, DDR RAM, SDRAM, Rambus RAM, EEPROM, etc.) which may be mutable or immutable, a system interconnect 940 (e.g., LDT, PCI, ISA, etc.), and a terminal interface 950 (e.g., an ATM interface, an Ethernet interface, a Frame Relay interface, etc. The memory medium may include other types of memory as well, or combinations thereof. In other embodiments, card computing device 900 may include more, fewer, or different components than those illustrated in FIG. 9. The processor(s) 970, the terminal interface 950 and the system memory 910 may be coupled to the system interconnect 940.

One or more of the system memories 910 may include program instructions 920 configured to implement some or all of the techniques described herein for establishing and managing secure channel communications (according to any of the embodiments described herein). For example, one or more of the system memories 910 may include code to implement and/or execute host API 125, gateway API 730 and/or gateway application 735, according to one embodiment.

In various embodiments, program instructions 920, host API 125, gateway API 730, gateway application 735, and/or individual sub-modules of these components may each be implemented in any of various programming languages or methods. For example, in one embodiment, host API 125, gateway API 730 and/or gateway application 735 may be JAVA based, while in another embodiment, they may be written using the C or C++ programming languages. Moreover, in some embodiments, program instructions 920, host API 125, gateway API 730 and/or gateway application 735, and various sub-modules of these components may not be implemented using the same programming language.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A computing device, comprising:
    a physical host controller device configured to provide a Host Controller Interface (HCI) network; and
    a plurality of physical host elements connected to the physical host controller device via the HCI network, wherein the plurality of physical host elements are configured to communicate with the physical host controller device over the HCI network according to an HCI communication protocol;
    wherein a respective one of the plurality of physical host elements is configured to:
        provide a plurality of runtime execution environments for executing applications on the respective one of the plurality of physical host elements, wherein the plurality of runtime execution environments co-exist and execute on the same respective one of the plurality of physical host elements distinct from the physical host controller device; and
        provide a host Application Programming Interface (API) to enable the applications to communicate over the HCI network according to the HCI communication protocol; and
    wherein the applications executing on the same respective one of the plurality of physical host elements are configured to respectively establish, via the host API, separate communication gates between the same respective one of the plurality of physical host elements and the physical host controller device, wherein the separate communication gates are configured to enable communication between the respective applications and the physical host controller device so that the respective applications communicate as separate HCI hosts on a single physical link to the physical host controller device.

2. The computing device of claim 1, wherein the respective one of the plurality of physical host elements is further configured to request, in response to a request from the respective application via the host API, a host identifier (ID) from the host controller, wherein the host ID uniquely identifies the respective one of the plurality of physical host elements among the plurality of physical host elements as a host element on the computing device.

3. The computing device of claim 2, wherein the host controller is configured to assign, in response to the request for a host ID, a respective host ID that uniquely identifies the respective one of the plurality of physical host elements among the plurality of physical host elements.

4. The computing device of claim 1, wherein the respective one of the plurality of physical host elements is implemented according to a Java Card specification, and wherein the respective one of the plurality of physical host elements comprises a runtime component implemented according to a platform-independent object-oriented language.

5. The computing device of claim 1, wherein the respective one of the plurality of physical host elements is further configured to store, in an information registry, information regarding the applications on the respective one of the plurality of physical host elements, wherein the information registry is configured to store information regarding applications executing within the computing device.

6. The computing device of claim 5, wherein the host controller is configured to manage the information registry, wherein to store the information in the information registry, the respective one of the plurality of physical host elements is configured to provide the information, over the HCI network, to the host controller, and wherein the host controller is configured to save the provided information in the information registry.

7. The computing device of claim 5, wherein another one of the plurality of physical host elements is configured to manage the information registry, wherein to store the information in the information registry, the respective one of the plurality of physical host elements is configured to provide the information, over the HCI network, to the other one of the plurality of physical host elements, and wherein the other one of the plurality of physical host elements is configured to save the provided information in the information registry.

8. The computing device of claim 1, wherein the respective application is configured to discover, via the host API, individual ones of the plurality of physical host elements as communication endpoints within the HCI network.

9. The computing device of claim 8, wherein the respective one of the plurality of physical host elements is configured to receive, in response to a request from the respective application via the host API, information from the host controller that identifies the individual ones of the plurality of physical host elements as communication endpoints via the HCI communication protocol.

10. The computing device of claim 1, wherein the respective one of the plurality of physical host elements is one or more of:
 a Subscriber Identity Module (SIM) card;
 a Universal Integrated Circuit Card (UICC);
 a smart micro Secure Digital (microSD) card; or
 a secure element configured to prevent unauthorized access to data stored on the secure element, wherein the secure element is one or more of:
  an embedded secure element; or
  a secure element configured to execute a Trusted Execution Environment (TEE) platform.

11. A non-transitory, computer-readable storage medium storing program instructions that when executed on a host element of a computing device implement a runtime component configured to:
 provide a plurality of runtime execution environments for executing applications on the host element, wherein the plurality of runtime execution environments co-exist on the host element;
 provide a host Application Programming Interface (API) enabling the applications to communicate with other host elements on the computing device over a Host Controller Interface (HCI) network according to an HCI communication protocol, wherein the HCI network is provided by a host controller on the computing device; and
 establish, in response to requests by the applications, via the host API, communication gates between the host element and the host controller, wherein the communication gates are configured to enable communication between the respective applications and the host controller, according to the HCI communication protocol, so that the respective applications communicate as separate HCI hosts on a single physical link to the host controller.

12. The medium of claim 11, wherein the runtime component is further configured to request, in response to a request by a respective one of the applications via the host API, a host identification (ID) from the host controller, wherein the host ID identifies the host element as a host element on the computing device and uniquely identifies the host element among host elements on the computing device.

13. The non-transitory, computer-readable storage medium of claim 11, wherein the runtime component is further configured to: discover, in response to a request by a respective one of the applications via the host API, individual ones of the other host elements as communication endpoints within the HCI network.

14. The non-transitory, computer-readable storage medium of claim 11, wherein the runtime component is further configured to: establish, in response to a request by a respective one of the applications via the host API, another communication gate with another host element on the computing device, wherein the other communication gate is configured to allow communication between the respective one of the applications and the other host element.

15. The non-transitory, computer-readable storage medium of claim 11, wherein the runtime component is further configured to:
 store in an information registry on the computing device, information regarding a respective one of the applications; and
 read, from the information registry, information regarding applications executing on the other host elements.

16. A computing device, comprising:
 a physical host controller device configured to provide for a Host Controller Interface (HCI) network; and
 one or more physical host elements connected to the physical host controller via the HCI network;
 wherein the one or more physical host elements and the physical host controller are configured to communicate over the HCI network according to an HCI communication protocol, wherein each of the one or more physical host elements is individually addressable within the HCI network using respective host identifiers;
 wherein a particular one of the one or more physical host elements comprises:
  a plurality of runtime execution environments, wherein the plurality of runtime execution environments co-exist and execute on the particular one of the one or more physical host elements; and
  a router gateway configured to enable individual ones of the plurality of runtime execution environments to communicate over the HCI network as respective virtual hosts using the respective host identifier for the particular one of the one or more physical host elements, and wherein the router gateway is configured to route messages between a respective one of the virtual hosts over the HCI network and other hosts communicating using the HCI communication protocol over the HCI network.

17. The computing device of claim 16, wherein the router gateway is further configured to:
    receive a request to establish a communicate gate as an endpoint for communicating on the HCI network from a requesting one of the virtual hosts;
    in response to the request, establish a communication gate as an endpoint for communication on the HCI network; and
    associate the established communication gate with the requesting one of the virtual hosts.

18. The computing device of claim 16, wherein the router gateway is further configured to:
    receive a request from a requesting one of the virtual hosts to establish a communicate pipe for communicating with another host over the HCI network via a particular communication gate of the other host;
    in response to the request, open a communication pipe with the other host via the particular communication gate of the other host;
    associate the communication pipe with the requesting one of the virtual hosts; and
    route messages received over the communication pipe from the other host to the requesting one of the virtual hosts, based on the association between the open pipe and the requesting one of the virtual hosts.

19. The computing device of claim 16, wherein the router gateway is further configured to:
    receive a request from a requesting one of the virtual hosts for information describing a host topology of the HCI network; and
    in response to receiving the request from the requesting one of the virtual hosts, providing the information describing a host topology of the HCI network to the requesting one of the virtual hosts.

20. The computing device of claim 16, wherein one of the plurality of runtime execution environments comprises a Rich Operating System (RichOS) and wherein another of the plurality of runtime execution environments comprises a Trusted Execution Environment (TEE).

* * * * *

UNITED STATES PATENT AND TRADEMARK OFFICE
CERTIFICATE OF CORRECTION

| | | |
|---|---|---|
| PATENT NO. | : 10,387,219 B2 | Page 1 of 1 |
| APPLICATION NO. | : 14/643484 | |
| DATED | : August 20, 2019 | |
| INVENTOR(S) | : Hans | |

It is certified that error appears in the above-identified patent and that said Letters Patent is hereby corrected as shown below:

In the Drawings

On sheet 8 of 9, in FIG. 8, under Reference Numeral 810, Line 1, delete "and" and insert -- an --, therefor.

In the Specification

In Column 6, Line 59, delete "and or" and insert -- and/or --, therefor.

In Column 7, Line 62, after "110." delete "1".

Signed and Sealed this
Twenty-fifth Day of August, 2020

Andrei Iancu
*Director of the United States Patent and Trademark Office*